United States Patent Office 3,258,432
Patented June 28, 1966

3,258,432
METHOD OF PREPARING CATALYST COMPOSITIONS CONSISTING OF THE OXIDES OF ANTIMONY AND TIN
Edward James Gasson, Epsom Downs, and Rowland Harris Jenkins, West Ewell, Surrey, England, assignors to The Distillers Company Limited, Edinburgh, Scotland, a British company
No Drawing. Filed Mar. 18, 1963, Ser. No. 266,034
Claims priority, application Great Britain, Apr. 6, 1962, 13,236/62
3 Claims. (Cl. 252—461)

This invention relates to catalytic compositions and in particular to catalytic compositions for use in oxidation reactions.

Accordingly the present invention is a catalytic material suitable for catalysing the vapour phase oxidation of hydrocarbons which comprises a composition selected from the group consisting of antimony tetroxide combined with stannic oxide and antimony tetroxide in admixture with stannic oxide having an atomic ratio of tin to antimony of 2 to 1 to 16 to 1 prepared by mixing together in the desired proportions any of the oxides of antimony and tin and heating the mixture to a temperature in the range 550 to 1100° C. in the presence of molecular oxygen, in admixture with 5 to 50% by weight of antimony trioxide based on the total weight of the material, and which has been heated to a tempreature in the range 550 to 1100° C. in the presence of molecular oxygen.

The composition may be regarded either as a mixture of antimony tetroxide with stannic oxide or as a compound of antimony, tin and oxygen; under the reaction conditions either or both forms may be present in the catalyst. The composition may be prepared from any of the oxides of antimony and tin, or from compounds of tin or antimony which on heating in the presence of an oxygen-containing gas, such as air, are converted to the oxides. Oxides of antimony and tin which may be used in the manufacture of the composition include antimony trioxide, antimony tetroxide, antimony pentoxide or mixtures of such oxides; stanic oxide, stannous oxide, or mixtures of such oxides. Hydrated forms of these oxides may also be used, for instance such as are formed by the action of aqueous nitric acid on antimony or tin metals or on mixtures of the metals. The composition may be prepared for instance by mixing together any of the oxides of antimony and tin, or substances yielding these oxides, and subjecting the mixture to a heat-treatment in the presence of an oxygen-containing gas such as air, for instance at a temperature between 550 and 1100° C. Where the initial componets are antimony tetroxide and stannic oxide themselves, it is still preferred to subject the mixture to a prior heat-treatment with or without oxygen for instance at a temperature between 550 and 1100° C.

A particularly preferred method of preparing the antimony oxide/tin oxide composition comprises intimately mixing stannic oxide or the hydrated oxide obtained by the action of aqueous nitric acid on tin metal, with antimony pentoxide, antimony tetroxide, or the hydrated oxide formed by the action of aqueous nitric acid on antimony metal, and heat-treating the resulting mixture at 550 to 1100° C. in the presence of an oxygen-containing gas such as air.

Another preferred method of preparing the antimony oxide-tin oxide composition comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the composition may be prepared in this way. Particularly useful compositions can be prepared by this method from stannic chloride and antimony pentachloride by mixing them together in aqueous media and adding ammonia until the pH is greater than 5.0, recovering the precipitate and heating it at a temperature between 500 and 1100° C.

When the tin and antimony compounds in the mixture are present in the lower valency state, i.e. as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C.; in this way loss of the lower valent metallic compounds by volatilisation is avoided. A convenient way of doing this is to heat pellets of the composition in a furnace, the temperature of which is raised from about 300° to about 650° C., over a period of not less than about 8 hours, while passing a stream of air over the catalyst. After this preliminary heat-treatment, the mixture is then subjected to a final heat-treatment in air at a temperature in the range 550 to 1100° C.

The catalytic material of the present invention may, if desired, be deposited on a support such as silica.

By whichever method the oxides or hydrated oxides have been prepared, the mechanical stability of the finished catalyst is enhanced by washing, preferably with water before drying.

Reactions in which the catalytic material of this invention is of particular value as a catalyst include the oxidation of propylene to acrolein, the oxidative dehydrogenation of butene to butadiene in the presence of molecular oxygen, the oxidative dehydrogenation of methylbutene to isoprene in the presence of molecular oxygen, the conversion of propylene to acrylonitrile and of isobutene to methacrylonitrile in the presence of ammonia and molecular oxygen, and the conversion of methanol to hydrogen cyanide also in the presence of ammonia and molecular oxygen. The rate of heating is not critical, but may be such as to produce a temperature rise of 5 to 30° C. per hour. The final temperature of the heat treatment may suitably be maintained for a period of 10 to 32 hours.

The proportion of antimony trioxide employed may vary within moderately wide limits depending on the degree of hardness desired for the final composition.

Incorporation of the antimony trioxide with the composition may be effected by various suitable methods. Thus a catalytic material according to the present invention may be prepared by mixing together any of the oxides of antimony and tin or substances yielding these oxides, subjecting the mixture to a heat-treatment in the presence of molecular oxygen, e.g. in the form of air at a temperature in the range 550 to 1100° C., grinding the mixture to a granule size less than 30 mesh B.B.S., forming an aqueous slurry of the ground mixture with the desired amount of antimony trioxide, drying the mixture at 50 and 200° C. and heating it either in powder or pellet form at a temperature in the range 550 to 1100° C. in the presence of molecular oxygen.

The catalytic material of the present invention is found to possess an increased hardness over that obtained with oxidation catalysts hitherto and at the same time has a higher catalytic activity in oxidation reactions.

The embodiment is illustrated further with reference to the following examples.

*Example 1*

50 parts by weight of powdered tin metal was slowly added to a well stirred solution of 600 parts by weight of nitric acid (S.G.=1.42) in 1700 parts by weight of water. During the addition the acid was maintained at its boiling point.

6.4 parts by weight of powdered antimony metal was added to 568 parts by weight of nitric acid (S.G. 1.42) at 60–70° C. with stirring. Both of the above acid mixtures were boiled with stirring until no more nitrogen oxide fumes were evolved, whereupon the hydrated antimony oxide suspension was added to the tin mixture and stirred for several minutes. The mixture was filtered and the solid product washed with distilled water, dried and pelleted in admixture with 2% by weight of graphite.

The catalyst contained tin and antimony in the atomic ratio of 8:1. The granules were heated in a positive stream of air at 1000° C. for 16 hours, the temperature of the furnace being raised from ambient temperature to 300° C. over ca. 3 hours, from 300 to 725° C. at 35° per hour and 725 to 1000° C. for 5 hours. The catalyst was ground down to pass 30 mesh (B.S.S.) and 73.2 parts by weight of this powder were mixed with 7.7 parts by weight (9.5% by weight) of antimony trioxide and moistened with sufficient distilled water to form a paste. The mixture was thoroughly stirred, dried at 110° C. mixed with 2% by weight of graphite and pelleted.

The pellets were heated in a stream of air to 300° C. in ca. 3 hours, then to 725° C. at the rate of 21.4° per hour, and maintained at 725° C. for 16 hours. The pellets were sufficiently robust to withstand on average a crush force of 4.8 lbs. wt.

The catalyst was placed in a reactor maintained at 440° C. and a gaseous mixture of 10% by volume of propylene, 50% by volume of air and 40% by volume of steam was passed over the catalyst at 4 seconds contact time. Of the propylene fed, 35.2% was converted to acrolein and 8.0% to carbon dioxide. The yield of acrolein based on propylene converted was 67.7%.

*Example 2*

This example shows the inferior hardness of the catalyst when prepared without the addition of antimony trioxide after the first heat-treatment.

The catalyst was prepared as described in Example 1 except that no antimony trioxide was used. The final catalyst had a nominal atomic ratio of tin/antimony of 8. The catalyst pellets had an average crush force of 1.3 lbs. wt.

*Example 3*

A tin/antimony oxide catalyst was prepared from 100 parts by weight of powdered tin metal and 6.4 parts by weight of antimony metal, by the method described above in Example 1. The catalyst had a nominal atomic ratio of tin/antimony of 16. The granules were heated in a positive stream of air from ambient temperature to 300° C. in 3 hours, then from 300 to 500° C. at 20° per hour; from 500 to 725° C. at 35° per hour, and from 725 to 1000° C. at 55° per hour. The final temperature was maintained for a period of 16 hours. The catalyst was ground down to pass 30 mesh (B.S.S.) and 127.1 parts by weight of this powder were mixed with 21.7 parts by weight (14.6% by weight) of antimony trioxide and moistened with sufficient water to form a paste. The mixture was thoroughly stirred, dried at 110° C. mixed with 2% by weight of graphite and pelleted.

The pellets were heated in a stream of air, from ambient temperature to 300° C. in 3 hours; from 300 to 725° C. at 21° per hour, and maintained at 725° for 16 hours. Subsequently the catalyst was subjected to further heat-treatment at 800, 850 and 900° C. for 16 hours. The pellets were sufficiently robust to withstand on average, a crush force of 5.4 lbs. wt.

The catalyst was placed in a reactor maintained at 440° C. and a gaseous mixture of 10% by volume of propylene, 50% by volume of air and 40% by volume of steam was passed over the catalyst, the contact time being 4 seconds. Of the propylene fed, 40.2% was converted to acrolein and 8.3% to carbon dioxide. The yield of acrolein based on propylene consumed was 71.8%.

We claim:

1. A process of forming a hard catalyst for use in the vapor phase oxidation of hydrocarbons having an atomic tin-antimony ratio of from about 2 to 1 to about 16 to 1 which comprises the initial heating of a mixture of tin oxide and antimony oxide at a temperature of from 300° C. to 1100° C. in the presence of molecular oxygen, mixing resulting product with from 5% to 50% by weight of antimony trioxide based on the total weight and again heating to a temperature of from 550° C. to 1100° C. in the presence of molecular oxygen.

2. A process of forming a hard catalyst for use in the vapor phase oxidation of hydrocarbons having a tin-antimony ratio of from about 2 to 1 to about 16 to 1 which comprises the initial heating of a mixture of tin oxide and antimony oxide at a temeprature of from 300° C. to 1100° C. in the presence of molecular oxygen, grinding resulting product to a granule size less than 30 mesh B.S.S. forming an aqueous slurry of said product with antimony trioxide, drying said slurry at from 50° C. to 200° C. and heating resulting dried product at a temperature of from 550° C. to 1100° C. in the presence of molecular oxygen.

3. A process of forming a hard catalyst for use in the vapor phase oxidation of hydrocarbons having a tin-antimony ratio of from about 2 to 1 to about 16 to 1 which comprises (1) the initial heating of a composition consisting of tin oxide and antimony oxide, the said tin oxide being selected from the group consisting of stannous oxide, stannnic oxide, the hydrated oxide obtained by the action of aqueous nitric acid on tin metal, and mixtures thereof, the said antimony oxide being selected from the group consisting of antimony trioxide, antimony tetroxide, antimony pentoxide, the hydrated oxide obtained by the action of nitric acid on antimony metal and mixtures thereof at a temperature of from about 300° C. to 1100° C. in the presence of molecular oxygen, (2) mixing resulting product with from 5% to 50% by weight of antimony trioxide based on the total weight, and (3) again heating to a temperature of from 550° C. to 1100° C. in the presence of molecular oxygen.

References Cited by the Examiner
UNITED STATES PATENTS

| | | | |
|---|---|---|---|
| 3,094,552 | 6/1963 | Wood | 252—461 X |
| 3,094,565 | 6/1963 | Bethell et al. | 252—456 X |
| 3,149,914 | 9/1964 | Bellringer et al. | 252—461 X |
| 3,152,170 | 10/1964 | Barclay et al. | 252—461 X |
| 3,198,751 | 8/1965 | Bethell et al. | 252—461 |

OSCAR R. VERTIZ, *Primary Examiner.*

MAURICE A. BRINDISI, BENJAMIN HENKIN,
*Examiners.*

G. T. OZAKI, *Assistant Examiner.*